(12) United States Patent
Bowron et al.

(10) Patent No.: US 7,077,528 B1
(45) Date of Patent: Jul. 18, 2006

(54) DIGITAL PROJECTION DISPLAY SYSTEM WITH EXTERNAL LIGHT SOURCE

(75) Inventors: John William Bowron, Penetanguishene (CA); Blaise Rene Robitaille, Penetanguishene (CA); Peter Duffield, Midland (CA); Paul LoRegio, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 36 days.

(21) Appl. No.: 10/830,673

(22) Filed: Apr. 22, 2004

(51) Int. Cl.
*G03B 21/14* (2006.01)
*G03B 21/22* (2006.01)
*G03B 21/28* (2006.01)
*G02B 17/00* (2006.01)

(52) U.S. Cl. .............................. 353/78; 353/81; 353/84; 353/99; 353/119; 359/726

(58) Field of Classification Search .................. 353/30, 353/31, 33, 34, 37, 73, 77, 78, 79, 81, 119, 353/98, 99; 359/651, 663, 679, 726, 653
See application file for complete search history.

(56) References Cited

U.S. PATENT DOCUMENTS

| | | | | |
|---|---|---|---|---|
| 5,453,803 A | * | 9/1995 | Shapiro et al. | 353/119 |
| 6,553,168 B1 | * | 4/2003 | Saccomanno | 385/116 |
| 6,712,475 B1 | * | 3/2004 | Davis et al. | 353/119 |
| 6,853,493 B1 | * | 2/2005 | Kreitzer | 359/651 |
| 6,859,239 B1 | * | 2/2005 | DeLong | 348/771 |
| 2002/0180934 A1 | * | 12/2002 | Shimizu | 353/30 |
| 2003/0151727 A1 | * | 8/2003 | Glent-Madsen et al. | 353/94 |
| 2005/0024594 A1 | * | 2/2005 | Kumai | 353/33 |

* cited by examiner

*Primary Examiner*—Melissa Jan Koval
(74) *Attorney, Agent, or Firm*—William C. Schubert; Karl A. Vick

(57) ABSTRACT

A digital projection display system includes one or more digital projection displays. Each digital projection display has an external light source producing as an output a light beam, an internal optics system, and a housing in which the internal optics system is received, but wherein the external light source is located external to the housing. A display screen forms one face of the housing. Preferably, an optical fiber extends from the output of the external light source to an input of the internal optics system. Multiple digital projection displays may be illuminated by a single external light source using multiple optical fibers.

26 Claims, 6 Drawing Sheets

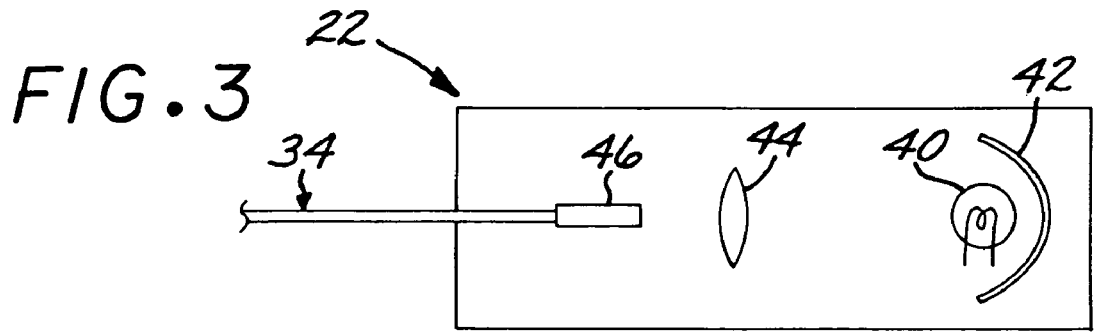
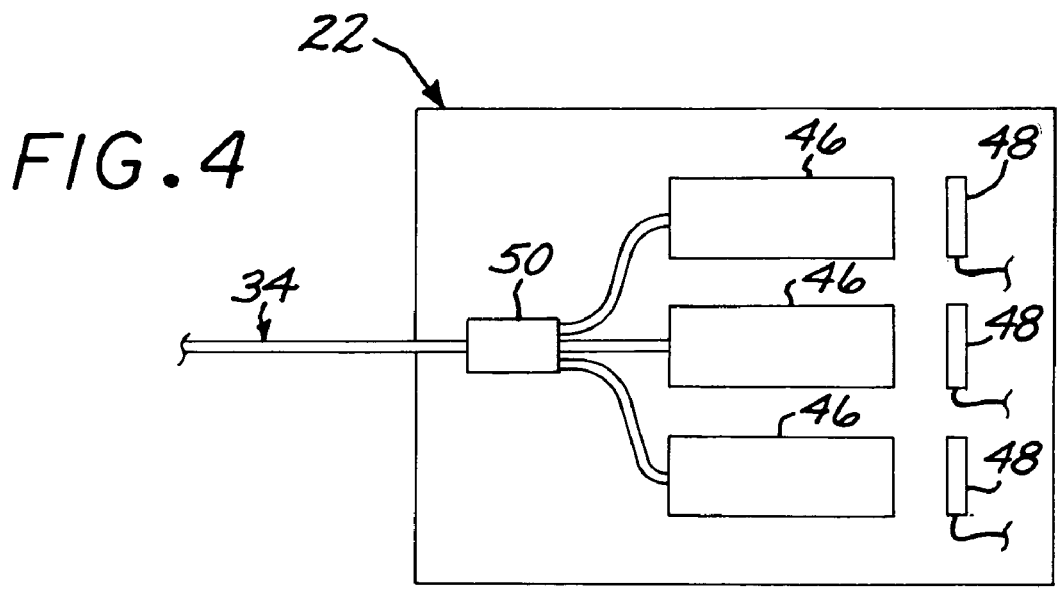
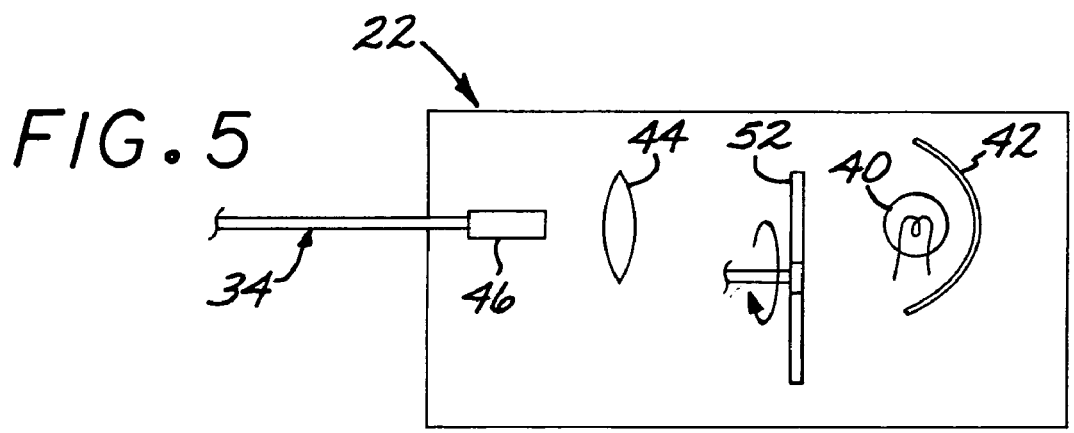

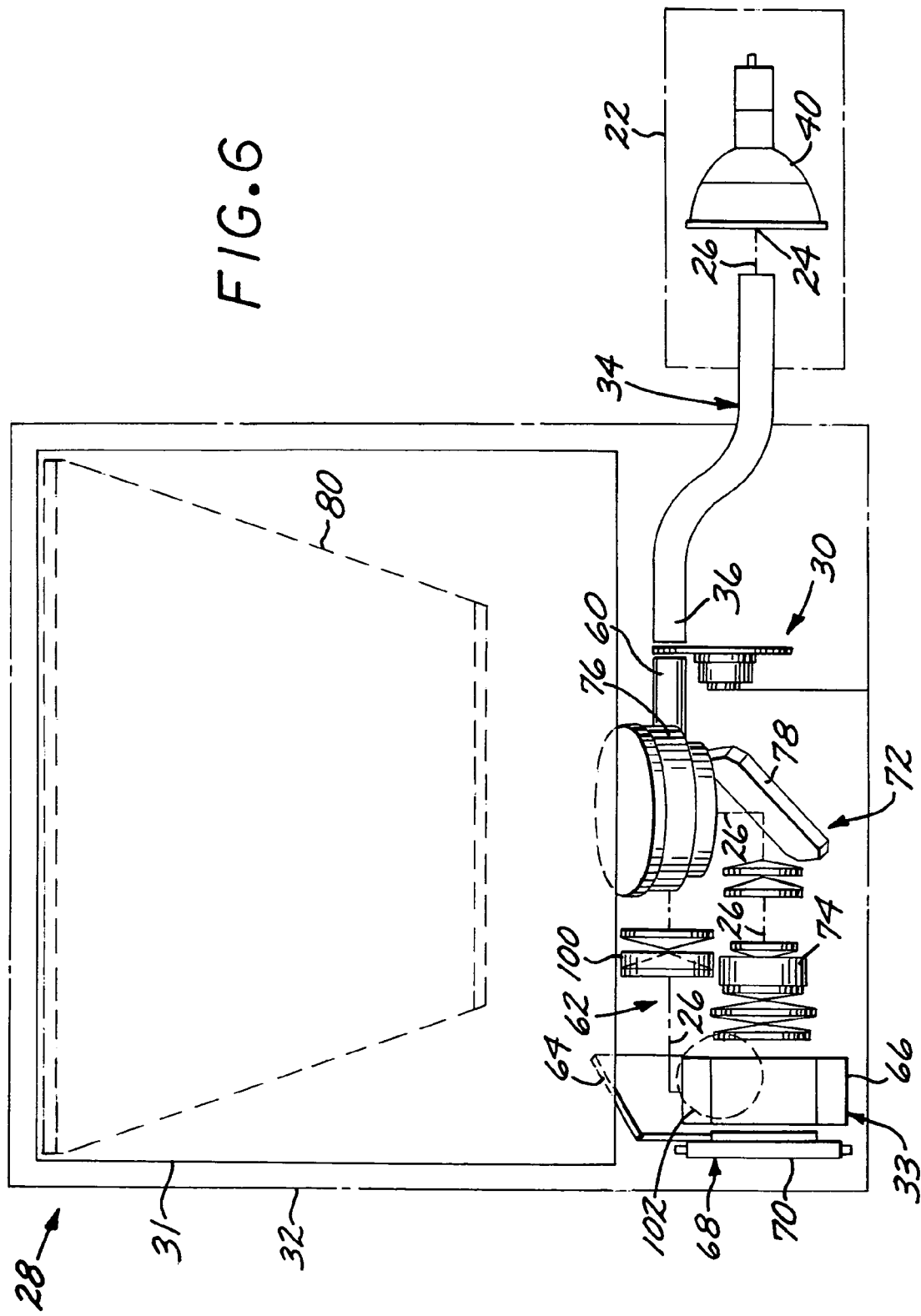

DIGITAL PROJECTION DISPLAY SYSTEM WITH EXTERNAL LIGHT SOURCE

This invention relates to an image display and, more particularly, to a compact digital projection display.

BACKGROUND OF THE INVENTION

Image displays are widely used in a range of products, including commercial products such as televisions and computer systems, and industrial and military products such as sensor displays and data displays. The image display typically receives image information in electronic form and uses that image information to modulate a light-producing beam, a light source, or a light beam that is then viewed by the user of the display. The image information may be in either an analog or digital electronic form. Digital information is increasingly used because of its precision and because of the ability to generate and manipulate the electronic information with a computer prior to its use in modulating the light of the display.

A wide variety of image displays are available. In the familiar cathode ray tube, the image information modulates an electron beam incident upon a phosphor screen, which produces visible light responsive to the modulated electron beam. The cathode ray tube has long been used in conventional televisions. In the liquid crystal display, electronic image information alters the state of the pixels of a liquid crystal panel, which in turn modulates a light beam directed through the liquid crystal panel. In a projection display, a light beam is modulated with a digital micromirror device, a liquid crystal display, or otherwise, and is projected onto a display screen.

In some applications there is a need for a medium-sized display that has a small depth for its screen size, has high image contrast for viewing in a range of circumstances, is rugged, is all-digital, is stable in use over a range of temperatures, and is relatively inexpensive. In the development leading to the present invention, the inventors determined that the cathode ray tube is not acceptable because it requires a glass vacuum-tube environment, which is not sufficiently rugged because it can explode if the glass if punctured, and additionally is not compact. Available liquid crystal displays have contrast limitations and cannot display a full grey scale. Additionally, they have too great a temperature sensitivity of their performance, and sometimes must be placed in temperature-controlled enclosures that negate some of the compactness advantages they might otherwise achieve.

The projection display using a digital micromirror device provides a potential approach. However, projection displays in intermediate screen sizes and small depths are not available. In one application, the present inventors seek to provide a projection display that meets all of the requirements indicated above, has a 13 inch diagonal display size DD, and has a housing envelope depth HD that is less than 5 inches. The relation of large screen size DD and small housing envelope depth HD can be met in larger screen sizes such as used in home entertainment systems, but it cannot be met with existing configurations in intermediate screen sizes because may components do not scale down in size proportionate to the screen size. There is therefore a need for an improved projection display suitable for use in compact applications with an intermediate screen size, and is suitable for use in multi-display systems. The present invention fulfills this need, and further provides related advantages.

SUMMARY OF THE INVENTION

The present approach provides a digital projection display system that is particularly useful with digital projection displays using medium-size display-screens having a diagonal measurement of from about 10 to about 20 inches. The digital projection display has a small depth for its screen size, has high image contrast for viewing in a range of circumstances, is rugged, is all-digital, is stable in use over a range of temperatures, and is relatively inexpensive to produce. The present approach is particularly useful in applications where there are multiple digital projection displays in the digital projection display system.

In accordance with the invention, a digital projection display system comprises a digital projection display. The digital projection display comprises an external light source producing as an output a light beam, an internal optics system, and a housing in which the internal optics system is received. The external light source is located external to the housing. An optical fiber may extend from the output of the external light source to an input of the internal optics system.

In one embodiment, the internal optics system includes an integrator that receives the light beam from the light source. The integrator has an input of an integrator input size and shape, and the optical fiber may have an output end size and shape the same as the integrator input size and shape. There is an illumination lens that receives the light beam from the integrator, an illumination fold mirror that receives the light beam from the illumination lens, and a light director such as a TIR prism that receives the light beam from the illumination fold mirror. The illumination lens may comprise two illumination lens elements, with the illumination fold mirror positioned between the two illumination lens elements so that the light beam passes through the first illumination lens element, reflects from the illumination fold mirror, and passes through the second illumination lens element to the light director. Thus, "receives the light beam from the illumination lens" may refer to receiving the light beam from one or more of the illumination lens elements. The digital projection display further includes a digital light modulator (such as a digital micromirror device) that receives the light beam from the light director and spatially modulates the light beam.

A projection lens receives the light beam in the spatially modulated form from the digital light modulator. The projection lens has at least a first projection lens element and a second projection lens element spaced apart from the first projection lens element. A projection lens fold mirror is disposed between the first projection lens element and the second projection lens element. The light beam passes through the first projection lens element, reflects from the projection lens fold mirror, and passes through the second projection lens element. A projection fold mirror receives the light beam from the projection lens and redirects the light beam. Preferably, the illumination fold mirror reflects the light beam through an angle of about 80 degrees, the projection lens fold mirror reflects the light beam through an angle of about 90 degrees, and the projection fold mirror reflects the light beam through an angle of about 72 degrees. A color wheel may be positioned to intercept the light beam, so that a single light source may be used to produce color images. Additionally, the throw ratio of the digital light projector, defined as the distance along the light path from the display screen to the nodal point closest to the display screen, divided by the width of the display screen, is about 1.1.

Preferably in this embodiment, there is a display screen that receives the light beam from the projection fold mirror. The display screen typically forms a face of the housing. The light beam is incident upon the display screen substantially perpendicularly to the display screen. Desirably, the display screen has a display screen diagonal dimension DD, wherein the housing has a housing envelope depth HD and a housing envelope volume V, and wherein a quantity (DD/HD)/V is at least $2\times10^{-3}$ in$^{-3}$, preferably at least $2.5\times10^{-3}$ in$^{-3}$. In an application of particular interest, the display screen diagonal dimension DD is about 13 inches, and the housing envelope depth HD is less than about 5 inches.

The present architecture permits a variety of different configurations. In one, the external light source includes at least two light sources, and the digital projection display further includes an optical fiber extending from the output of each of the external light sources to an input of the internal optics system. The outputs of the at least two light sources may be of different wavelengths, such as differently colored light sources. In another structure, a second digital projection display has the internal optics system as described above, and both the internal optics system of the digital projection display and the internal optics system of the second digital projection display receive their light beams from the same external light source.

More generally, a digital projection display system comprises a single external light source producing as an output a light beam, and at least two digital projection displays. Each digital projection display comprises an internal optics system, and a housing in which the internal optics system is received. The external light source is located external to the housing. An optical fiber extends from the output of the external light source to an input of each of the internal optics systems.

The present approach places the external light source outside the housing. This architecture allows the single light source to supply illumination for one, or more than one, digital projection display. The use of the single light source external to the housing reduces the heat load internally within the housing, an important advantage in some applications which allows the digital projection display to be operated in an uncooled fashion. The external placement of the light source allows it to be easily changed as needed, without intruding into the interior of the housing that contains the internal optics system. Such an intrusion could otherwise lead to misaligning of the optics or the introduction of dirt or other contamination into the optics, which is avoided by the present approach. The use of a single light source to illuminate more than one digital projection display, typically through optical fibers leading to each of the digital projection displays, is a convenience in systems such as used in fighting vehicles where there may be several digital projection displays in the system. That a single light source is used does not require that the same information be displayed on each of the several digital projection displays, since the digital light modulators of the several digital projection displays are independently driven. The removal of the light source from the interior of the housing also allows the housing to be smaller and shallower, an important advantage in some applications which have tight space constraints for the digital projection display.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a schematic elevational view of a first embodiment of an external light source;

FIG. 4 is a schematic elevational view of a second embodiment of the external light source;

FIG. 5 is a schematic elevational view of a third embodiment of the external light source;

FIG. 6 is a schematic front view of a digital projection display according to an embodiment of the present approach;

DETAILED DESCRIPTION OF THE INVENTION

Figure 1:
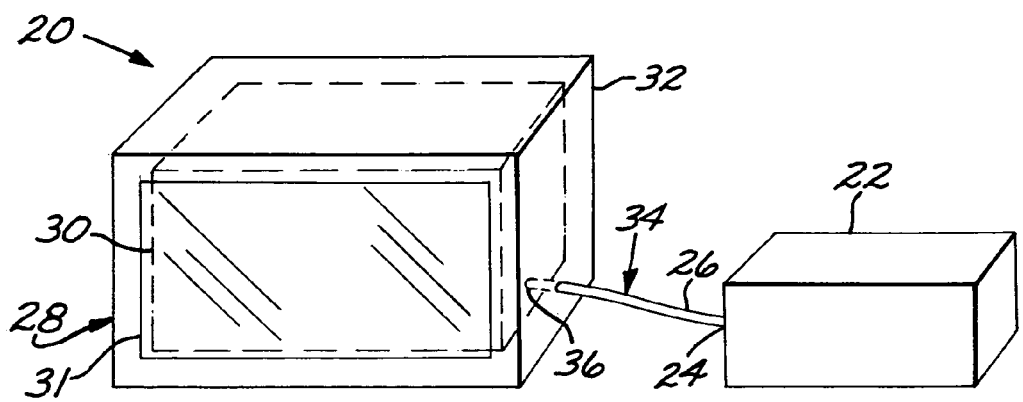
FIG. 1 is a schematic perspective view of a first embodiment of a digital projection display system.
Figure 2:
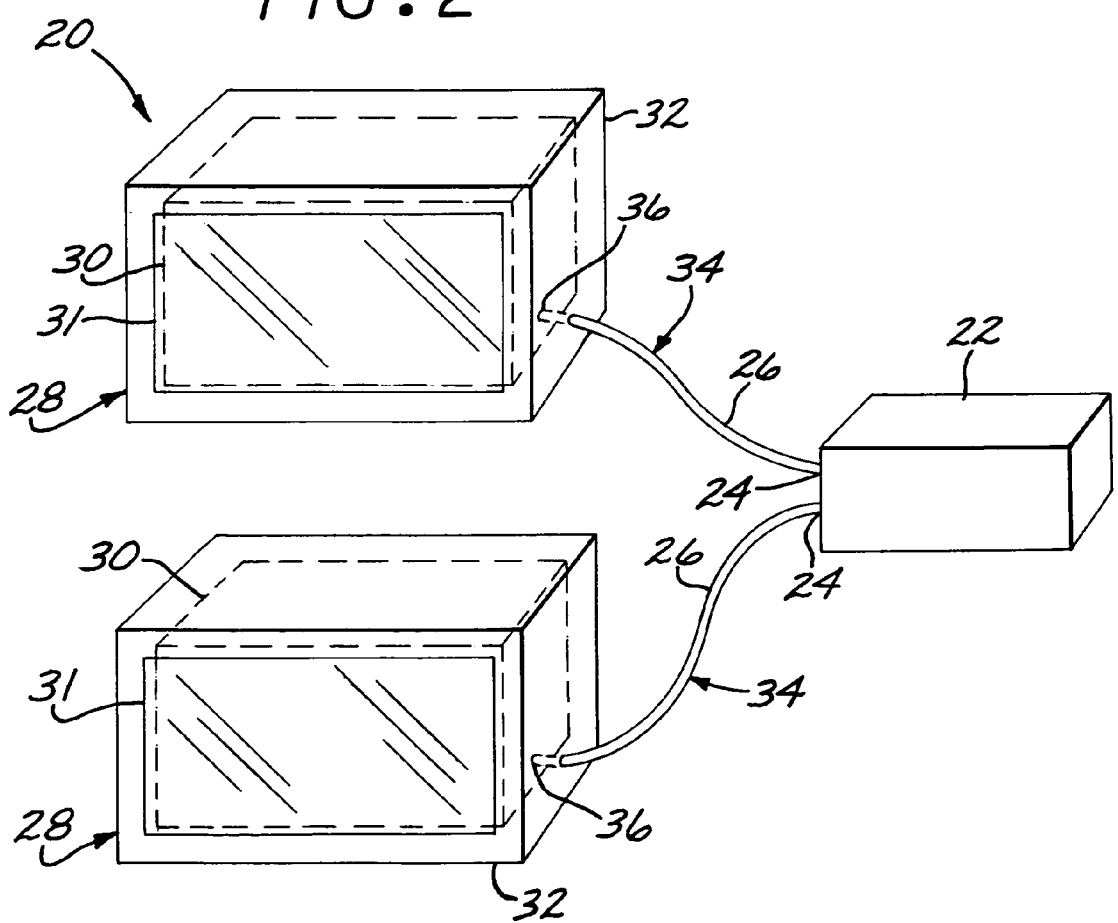
FIG. 2 is a schematic perspective view of a second embodiment of the digital projection display system.

FIGS. 1–2 depict two embodiments of a digital projection display system 20. In each case, there is a single external light source 22 producing as an output 24 a light beam 26. In the embodiment of FIG. 1, there is a single digital projection display 28, having an internal optics system 30, and a housing 32 in which the internal optics system 30 is received. The visual output of the digital projection display 28 is viewed on a display screen 31, which preferably forms one face of the housing 32. The external light source 22 must be located external to the housing 32. In the embodiment of FIG. 2, there are at least two digital projection displays 28, and in the illustrated case exactly two digital projection displays 28. Each of the digital projection displays 28 is illustrated to have a structure identical to that of the digital projection display 28 of FIG. 1, but that need not be the case. However, as with the embodiment of FIG. 1, each of the digital projection displays 28 receives its illumination from the external light source 22 that is located outside of the housing 32 of the digital projection display 28. In the embodiment of FIG. 2, all of the digital projection displays 28 receive their illumination from a single external light source 22. In each of the embodiments of FIGS. 1 and 2, an optical fiber 34 conducts the light beam 26 that is the output 24 of the external light source 22 to an input 36 of the internal optics system 30 of the respective digital projection display 28. The optical fiber 34 may include a single strand of optical fiber material, in which case it may also be termed a light pipe or a light guide, or it may include more than one strand of optical fiber material, in which case it may also be termed an optical fiber cable.

The external light source 22 may be of any operable type. FIGS. 3–5 illustrate three embodiments of the external light source 22, but the structure of the external light source 22 is not limited to these three embodiments. In FIGS. 3–5, identical elements are given the same numerical identifier, and the description is incorporated between the figures as appropriate. In the embodiment of FIG. 3, a compact arc lamp illumination source 40 with a reflector 42 directs its light output through a condenser lens 44 and into the optical fiber 34, which is optionally provided with a collimator 46. In the embodiment of FIG. 4, three non-incandescent illumination sources 48 are used instead of the incandescent illumination source 40 of FIG. 3. The non-incandescent illumination sources 48 may be, for example, light-emitting diodes. The light outputs of the non-incandescent illumination sources 48 are combined and mixed by a light combiner 50 and supplied to the optical fiber 34. The non-incandescent illumination sources 48 are typically chosen to be of different wavelengths. The non-incandescent illumination sources 48 may be operated together or, more preferably, are operated sequentially to provide illumination of different colors to the internal optics system 30 of the digital projection display 28. The embodiment of FIG. 5 is similar to that of FIG. 3, except that a rotating color wheel 52 is positioned to intercept the light beam from the incandescent light source 40. The embodiments of FIGS. 4–5 provide a color image output of the display screen 31 of the digital projection display 28.

Figure 7:
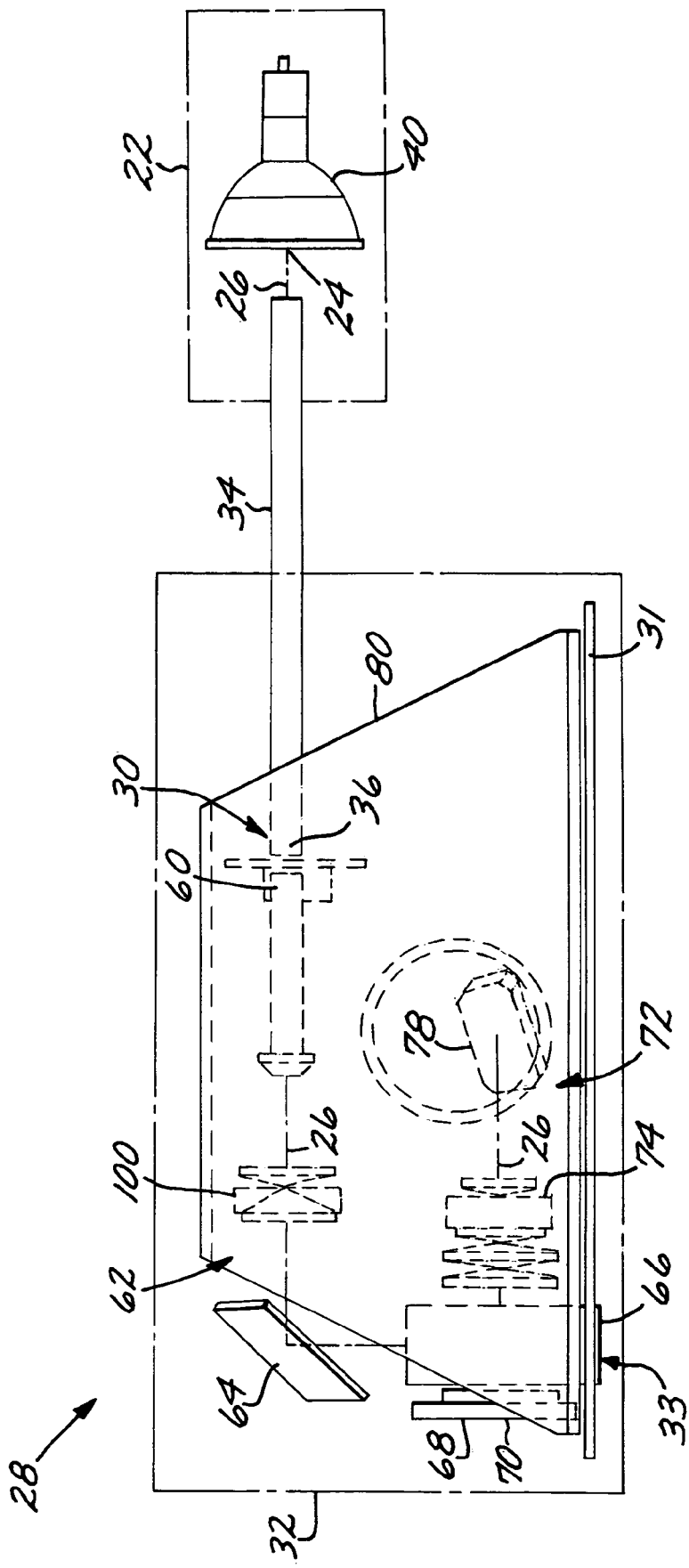
FIG. 7 is a schematic top view of the digital projection display of FIG. 6.
Figure 8:
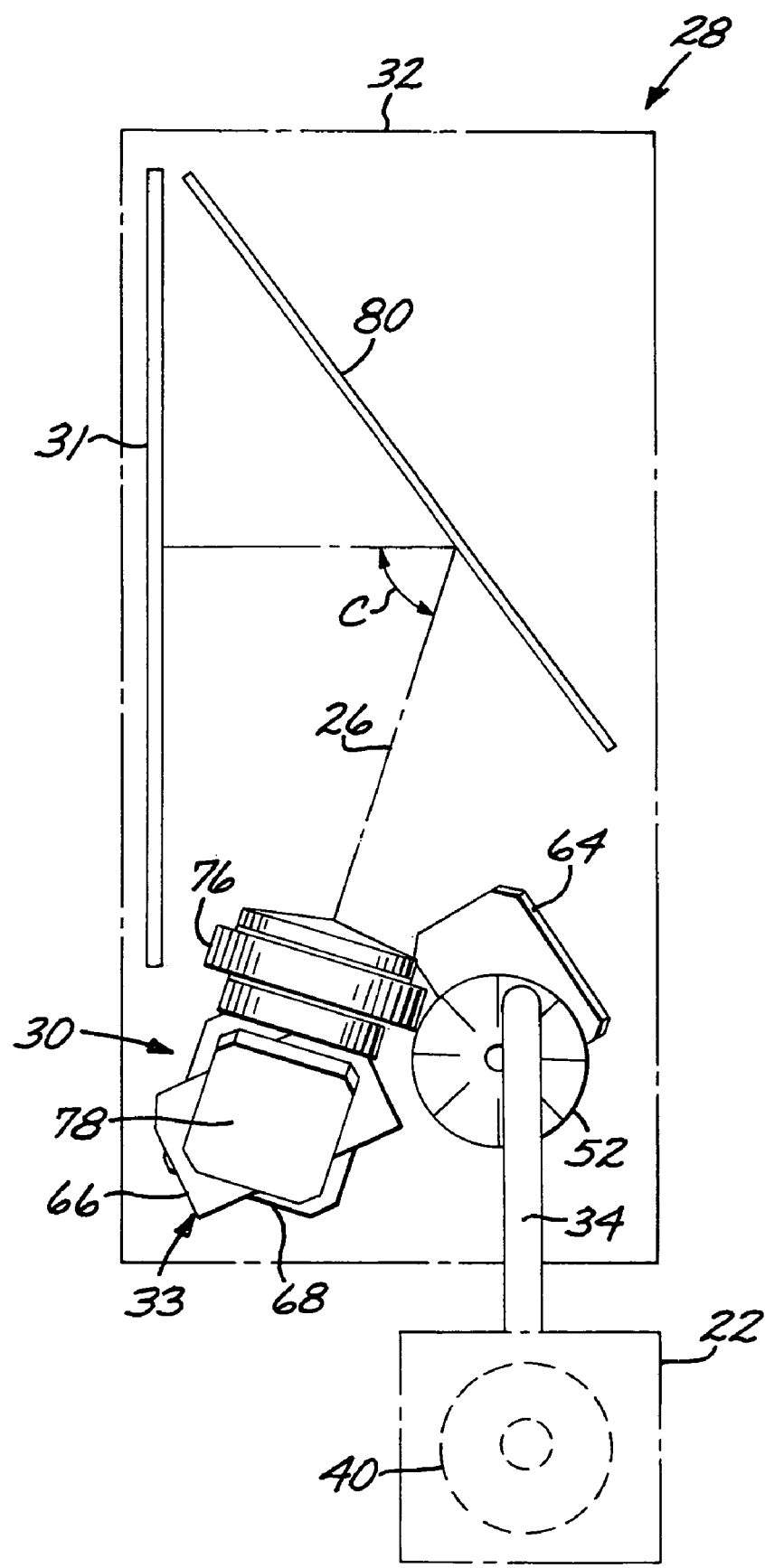
FIG. 8 is a schematic side view of the digital projection display of FIG. 6.
Figure 9:
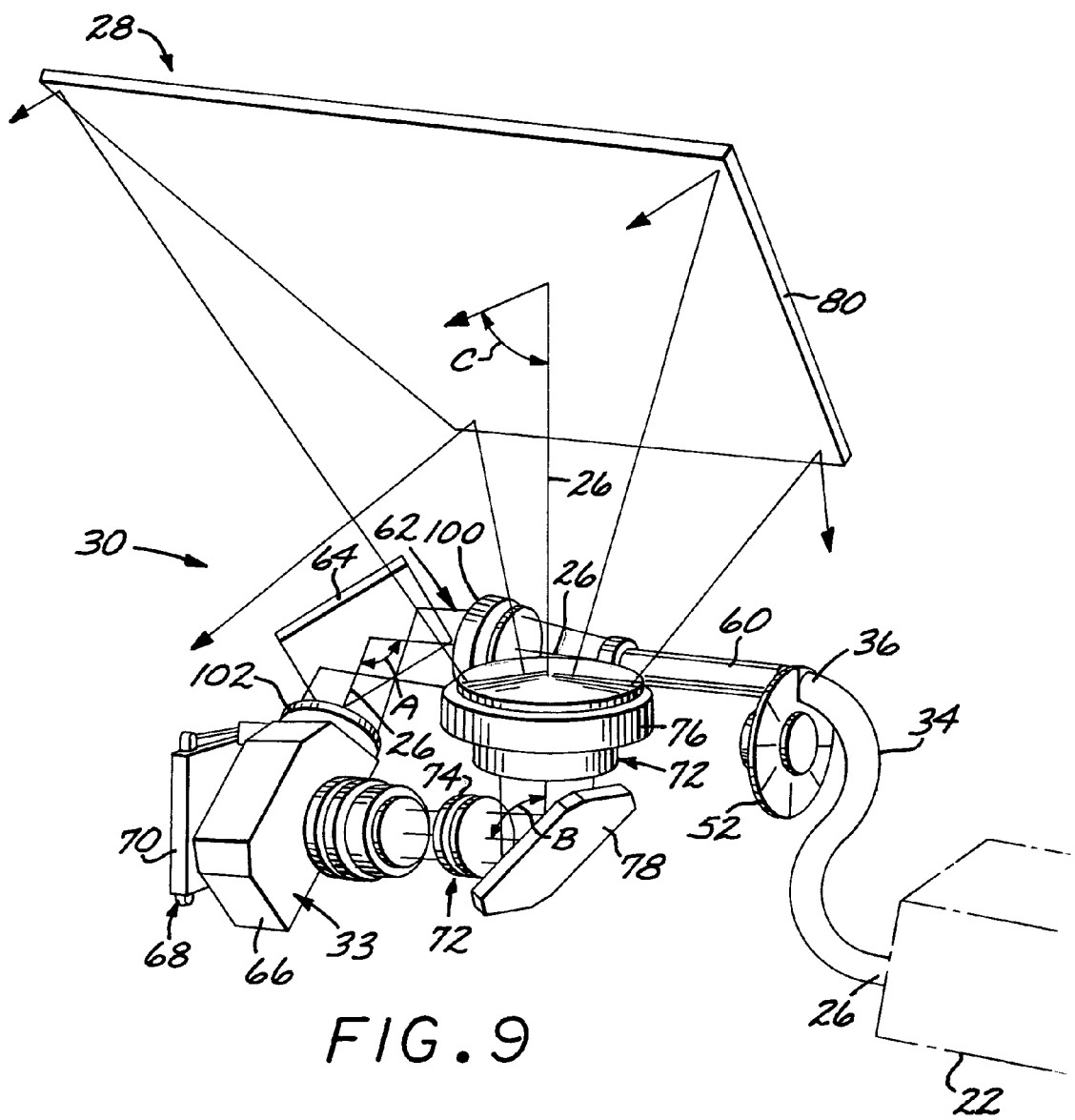
FIG. 9 is a schematic perspective view of the optics of the digital projection display of FIGS. 6–8.

FIGS. 6–9 depict in greater detail the digital projection display 28 according to one embodiment of the present approach. FIGS. 6–8 show the digital projection display 28 in its isometric views, and FIG. 9 shows the internal optics system 30 of the digital projection display 28 in a perspective view. The structure of the digital projection display 28 is most readily discussed in terms of its light path from the light source to the display screen.

The digital projection display 28 includes the external light source 22 producing as its output 24 the light beam 26. The external light source 22 may be of any operable type, such as those discussed earlier.

Optionally but preferably, the color wheel 52 is present and receives the light beam 26 from the external light source 22. In the light source 22 of FIG. 5, the color wheel 52 is illustrated as part of the external light source 22, and no further color wheel is used. In FIGS. 6–9, the color wheel 52 is illustrated in an alternative embodiment in which it is located within the housing 32. In either approach, the color wheel 52 spins in the light beam 26 so that the light beam 26 is sequentially colored with the primary red-blue-green colors that are combined to produce a full-color image after subsequent modulation. A white fourth segment may also be present. The color wheel 52 is not required if the projected image is to be a black-white image.

An integrator 60 receives the light beam 26 from the color wheel 52 (or directly from the light source in the absence of the color wheel 52). The integrator 60 is preferably a solid transparent rod or a hollow pipe that provides multiple internal reflections of the light beam 26. The integrator has two effects. It makes the light beam 26 more uniform across its cross section and prevents the formation of an image of the filament of the external light source 22. Second, the integrator 60 shapes the light beam 26 to have the desired peripheral shape of the final projected image. In the usual case, the final projected image is rectangular, so that the output of the integrator 60 is rectangular with an aspect ratio that matches that of the display screen. The integrator 60 does not spatially modulate the light beam 26.

An illumination lens 62 receives the light beam 26 from the integrator 60. The illumination lens 62 may include one lens element or more than one lens element. In the illustration, the illumination lens has two lens elements 100 and 102. The illumination lens 62 images the exit end of the integrator 60 onto the digital light modulator to be discussed subsequently.

An illumination fold mirror 64 receives the light beam 26 from the illumination lens element 100 and reflects the light beam 26. The illumination fold mirror 64 changes the direction of the light beam 26. In combination with other fold mirrors in the digital projection display 28, the illumination fold mirror 64 allows the optics of the digital projection display 28 to fit within a compact envelope. In the preferred embodiment, the illumination fold mirror 64 reflects the light beam 26 through an angle A of about 80 degrees. After the light beam 24 reflects from the illumination fold mirror 64, it passes through the illumination lens element 102.

A light director 33, preferably a total internal reflection (TIR) prism 66, receives the light beam 26 from the illumination fold mirror 64. An internal reflective surface (not shown) of the TIR prism 66 is oriented such that the light beam 26 that enters the TIR prism 66 is totally reflected. In an alternative approach, termed an offset approach, a lens directs the light beam 24 to and from the light modulator (discussed next), and there is no TIR prism.

A digital light modulator 68 receives the light beam 26 from the light director 33 (preferably the TIR prism 66) and spatially modulates the light beam 26. The digital light modulator 68 receives image information in electronic form from a source (not shown). The digital light modulator 68 then spatially modulates the light beam 26 with that electronic image information. The digital light modulator 68 is preferably a digital micromirror device 70. The digital micromirror device 70 is an array of movable small mirrors, each of which small mirrors serves as the modulator for one pixel of the resulting image. By controlling the orientations of the individual small mirrors, each pixel of the incident light beam 26 may be selectively reflected in the proper direction to eventually form part of the reflected image (an illuminated pixel), or selectively reflected in another direction so that it does not form part of the reflected image (a dark pixel). The result is that the light beam 26 is spatially modulated.

The light beam 26 is sent back to the TIR prism 66 in its spatially modulated form. The internal reflective surface of the TIR prism 66 is oriented such that the incident light beam 26 that is received back from the digital light modulator 68 is not reflected by the internal reflective surface and passes through the TIR prism 66.

A projection lens 72 receives the light beam 26 in its spatially modulated form from the TIR prism 66. In the present design, the projection lens 72 has at least a first projection lens element 74 and a second projection lens element 76 that is spaced apart from the first projection lens element 74. Taken together, the lens elements of the projection lens 72 focus the light beam 26 onto the display screen 31 that is viewed by the user of the digital projection display 28. The throw ratio of the projection lens 72 is preferably about 1.1. The throw ratio is defined as the distance along the light path 24 from the display screen to the nodal point closest to the display screen, divided by the width of the display screen.

A projection lens fold mirror 78 is disposed between the first projection lens element 74 and the second projection lens element 76. The light beam 26 passes through the first projection lens element 74, reflects from the projection lens fold mirror 78, and passes through the second projection lens element 76. In the preferred embodiment, the projection lens fold mirror 78 reflects the light beam 26 through an angle B of about 90 degrees.

A projection fold mirror 80 receives the light beam 26 from the projection lens 72 (and specifically the second projection lens element 76) and redirects the light beam to the display screen 31. In the preferred embodiment, the projection fold mirror 80 reflects the light beam 26 through an angle C of about 72 degrees.

The digital projection display 28 preferably includes the housing 32 in which the integrator 60, the illumination lens 62, the illumination fold mirror 64, the light director 33, the digital light modulator 68, the projection lens 72, the projection lens fold mirror 78, and the projection fold mirror 80 are received. (The external light source 22 is not within the housing 32.) Optionally, the color wheel 52 may be within the housing 32 as well. The housing 32 has a housing envelope depth H), a housing envelope width HW, and a housing envelope height HH. A housing envelope volume V is the product HD times HW times HH, even though the housing 32 may not be a perfectly defined rectangular prism.

The digital projection display 28 preferably includes the display screen 31 that receives the light beam 26 from the projection fold mirror 80. The display screen 31 typically forms one face of the housing 32. The light beam 26 is desirably incident upon the display screen 31 substantially perpendicularly to the display screen 31. As a result, the display screen 31 need not be holographic in structure, with its associated high cost when produced in relatively small numbers, and the projected image on the display screen 31 is not distorted. The display screen 31 has a display screen (maximum) dimension DD. The display screen 31 is typically rectangular in shape, as illustrated, and the dimension DD is the diagonal dimension of the rectangular shape.

A calculated quantity (DD/HD)/V is preferably at least $2\times10^{-3}$ in$^{-3}$, and more preferably at least $2.5\times10^{-3}$ in$^{-3}$. The ratio (DD/HD) in this calculated quantity expresses the desired large display screen diagonal dimension DD in a small housing envelope depth HD. However, such a large ratio of DD/HD may be achieved in a large housing with large components, but is not easily achieved in a medium-size projection display having DD of from about 10 to about 20 inches, and with a small volume. Many of the components may not be directly scaled down in size to the same degree as is the display screen dimension. Components such as the lamp ballast, the projector lens, the integrator, and the electronics cannot be scaled down proportionately to a reduction in the size of the display screen. Consequently, although displays with a much larger screen size may be made with a relatively small housing envelope depth, it is much more difficult to achieve a relatively small housing envelope depth with a smaller display screen dimension. The present digital projection display preferably does not use a holographic display, which is used in some other projection displays. In selecting the design parameters, at first impression it might be thought that it is desirable that the throw ratio be as small as possible to produce a small volume. However, that is not the case, since too short of a throw ratio would interfere with the folding of the beam by the three fold mirrors 64, 78, and 80, because there would be insufficient room for the fold mirrors in the optics structure.

The reflection angles A, B, and C associated with the respective fold mirrors 32, 46, and 48 are chosen cooperatively and not individually. They are chosen to fit the internal optics system 30 of the digital projection display 28 into an acceptably small envelope, and to cause the light beam 26 to have perpendicular incidence upon the display screen 31 to thereby produce an acceptable, undistorted image for the viewer. That is, these reflection angles may not be chosen arbitrarily and independently of each other to achieve all of these conditions, and were in fact carefully chosen for the preferred embodiment. If the angles A, B, and C are other than 80, 90, and 72 degrees, respectively, the digital light projector 20 is still operable but does not achieve the optimal combination of envelope size and image quality.

The constructions of the color wheel 52, the integrator 60, the illumination lens 62, the illumination fold mirror 64, the TIR prism 66, the digital light modulator 68, the projection lens 72, the projection lens fold mirror 78, the projection fold mirror 80, and the display screen 31 are all known in the art individually for other applications.

Figure 10:
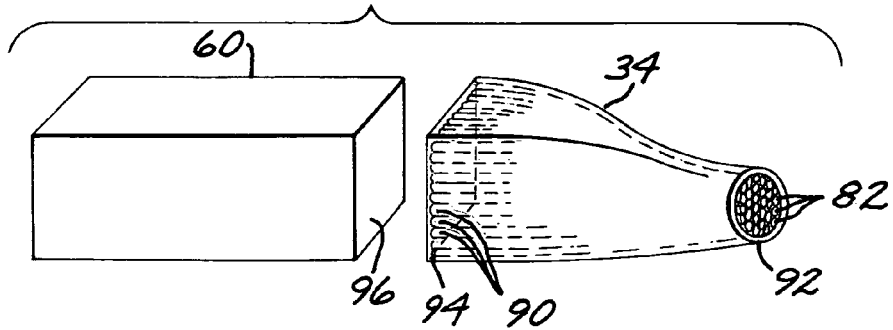
FIG. 10 is a schematic perspective view of a relation between the integrator and the optical fiber that extends from the output of the external light source

In an embodiment illustrated in FIG. 10, the optical fiber 34 is an optical fiber cable formed of a plurality of strands of individual optical fibers 90. At an input end 92 of the optical fiber 34, the strands of optical fiber 90 are arranged so that the input end 92 has a first cross-sectional shape, here a substantially circular cross-sectional shape. At an output end 94 of the optical fiber 34 that faces an input end 96 of the integrator 60, the strands of optical fiber 90 are arranged so that the output end 94 has a second cross-sectional shape, here a rectangular cross-sectional shape that matches the shape of the input end 96 of the integrator 60.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A digital projection display system comprising a digital projection display, wherein the digital projection display comprises:

an external light source producing as an output a light beam;

an internal optics system including an integrator that receives the light beam from the light source, an illumination lens that receives the light beam from the integrator, an illumination fold mirror that receives the light beam from the illumination lens, a light director that receives the light beam from the illumination fold mirror, a digital light modulator that receives the light beam from the light director and spatially modulates the light beam, a projection lens that receives the light beam in the spatially modulated form from the light director, wherein the projection lens has at least a first projection lens element and a second projection lens element spaced apart from the fist projection lens element, a projection lens fold mirror disposed between the first projection lens element and the second projection lens element, wherein the light beam passes through the first projection lens element, reflects from the projection lens fold minor, and passes through the second projection lens element, and a projection fold mirror that receives the light beam from the projection lens and redirects the light beam;

a housing in which the internal optics system is received, but wherein the external light source is located external to the housing; and a display screen that receives the light beam from the projection fold mirror, wherein the display screen forms a face of the housing.

2. The digital projection display system of claim 1, wherein the light director comprises a TIR prism.

3. The digital projection device of claim 1, wherein the light bean is incident upon the display screen substantially perpendicularly to the display screen.

4. The digital projection display system of claim 1, wherein the display screen has a display screen diagonal dimension DD, wherein the housing has a housing envelope depth HD and a housing envelope volume V, and wherein a quantity (DD/HD)/V is at least $2 \times 10^{-3}$ in$^{-3}$.

5. The digital projection display system of claim 1, further including
a color wheel positioned to intercept the light beam.

6. The digital projection display system of claim 1, wherein the digital light modulator is a digital micromirror device.

7. The digital projection display system of claim 1 wherein the illumination fold mirror reflects the light beam through an angle of about 80 degrees, the projection lens fold mirror reflects the light beam through an angle of about 90 degrees, the projection fold mirror reflects the light beam through an angle of about 72 degrees, and a throw ratio is about 1.1.

8. The digital projection display system of claim 1, including
an optical fiber extending from the output of the external light source to an input of the internal optics system.

9. The digital projection display system of claim 8, wherein the integrator has an input of an integrator input size and shape, and the optical fiber has an output end size and shape the same as the integrator input size and shape.

10. The digital projection display system of claim 1, wherein the external light source includes at least two light sources, and wherein the digital projection display further includes
an optical fiber extending from the output of each of the external light sources to an input of the internal optics system.

11. The digital projection display system of claim 10, wherein the outputs of the light sources are of different wavelengths.

12. The digital projection display system of claim 1, further including
a second digital projection display having the internal optics system as set forth in claim 1, and wherein both the integrator of the digital projection display and the integrator of the second digital projection display receive their light beams from the external light source.

13. A digital projection display system comprising a digital projection display, wherein the digital projection display comprises:
an external light source producing as an output a light beam;
an internal optics system including
an integrator that receives the light beam from the light source,
an illumination lens that receives the light beam from the integrator,
an illumination fold mirror that receives the light beam from the illumination lens, wherein the illumination fold mirror reflects the light beam through an angle of about 80 degrees,
a TIR prism that receives the light beam from the illumination fold mirror,
a digital micromirror device that receives the light beam from the TIR prism, spatially modulates the light beam, and sends the light beam back to the TIR prism in a spatially modulated form,
a projection lens that receives the light beam in the spatially modulated form from the TIR prism, wherein the projection lens has at least a first projection lens element and a second projection lens element spaced apart from the first projection lens element,
a projection lens fold mirror disposed between the first projection lens element and the second projection lens element, wherein the light beam passes through the first projection lens element, reflects from the projection lens fold minor, and passes though the second projection lens element, and wherein the projection lens fold mirror reflects the light beam through an angle of about 90 degrees, and
a projection fold mirror that receives the light beam from the projection lens and redirects the light beam, wherein the projection fold mirror reflects the light beam through an angle of about 72 degrees;
a housing in which the internal optics system is received, but wherein the external light source is located external to the housing; and
a display screen that receives the light beam from the projection fold mirror, wherein the display screen forms a face of the housing, and wherein the light beam is incident upon the display screen substantially perpendicularly to the display screen.

14. The digital projection display system of claim 13, wherein the display screen has a display screen diagonal dimension DD, wherein the housing has a housing envelope depth HD and a housing envelope volume V, and wherein a quantity (DD/HD)/V is at least $2 \times 10^{-3}$ in$^{-3}$.

15. The digital projection display system of claim 13, further including
a color wheel positioned to intercept the light beam.

16. The digital projection display system of claim 13, further including
an optical fiber extending from the output of the external light source to an input of the internal optics system.

17. The digital projection display system of claim 16, wherein the integrator has an input of an integrator input size and shape, and the optical fiber has an output end size and shape the same as the integrator input size and shape.

18. The digital projection display system of claim 13, wherein the external light source includes at least two light sources, and wherein the digital projection display further includes
an optical fiber extending from the output of each of the external light sources to an input of the internal otics system.

19. The digital projection display system of claim 18, wherein the outputs of the light sources are of different wavelengths.

20. The digital projection display system of claim 13, further including
a second digital projection display having the internal optics system as set forth in claim 14, and wherein both the integrator of the digital projection display and the integrator of the second digital projection display receive their light beams from the external light source.

21. A digital projection display system, comprising
a single external light source producing as an output a light beam;

at least two digital projection displays, wherein each
digital projection display an internal optics system, and
  a housing in which the internal optics system is
    received, but wherein the external light source is
    located external to the housing
  a display screen that receives the light beam from the
    internal optics system, wherein the display screen
    forms a face of the housing; and
an optical fiber extending from the output of the external
  light source to an input of each of the internal optics
  systems, wherein each optical fiber conveys a portion
  of the light beam to the internal optics system of each
  of the digital projection displays.

22. The digital projection display system of claim 21, wherein the display screen has a display screen diagonal dimension DD, wherein the housing has
  a housing envelope depth HD and a housing envelope
    volume V, and wherein a quantity (DD/HD)/V is at
    least $2\times10^{-3}$ in$^{-3}$.

23. A digital projection display system, comprising
a single external light source producing as an output a
  light beam;
at least two digital projection displays, wherein each
  digital projection display comprises
  a internal optics system, wherein the internal optics
    system comprises:
    an integrator that receives the light beam from the
      light source,
    an illumination lens that receives the light beam from
      the integrator,
    an illumination fold mirror that receives the light
      beam from the illumination lens,
    a light director that receives the light beam from the
      illumination fold mirror,
    a digital lit modulator that receives the light beam
      from the light director and spatially modulates the
      light beam,
    a projection lens that receives the light beam in the
      spatially modulated form from the light director,
      wherein the projection lens has at least a first
      projection lens element and a second projection
      lens element spaced apart from the first projection
      lens element,
    a projection lens fold mirror disposed between the
      first projection lens element and the second pro-
      jection lens element, wherein the light beam
      passes through the first projection lens element,
      reflects from the projection lens fold mirror, and
      passes through the second projection lens element,
      and
    a projection fold mirror that receives the light beam
      from the projection lens and redirects the light
      beam, and
  a housing in which the internal optics system is
    received, but wherein the external light source is
    located external to the housing; and
an optical fiber extending from the output of the external
  light source to an input of each of the internal optics
  systems, wherein each optical fiber conveys a portion
  of the light beam to the internal optics system of each
  of the digital projection displays.

24. The digital projection display system of claim 23, wherein the illumination fold minor reflects the light beam through an angle of about 80 degrees, the projection lens fold mirror reflects the light beam through an angle of about 90 degrees, the projection fold mirror reflects the light beam through an angle of about 72 degrees, and a throw ratio is about 1.1.

25. The digital projection display system of claim 23, wherein each of the digital projection displays further comprises:
  a display screen that receives the light beam from the
    internal optics system, wherein the display screen
    forms a face of the housing.

26. The digital projection display system of claim 25, wherein the display screen has a display screen diagonal dimension DD, wherein the housing has a housing envelope depth HD and a housing envelope volume V, and wherein a quantity (DD/HD)/V is at least $2\times10^{-3}$ in$^{-3}$.

* * * * *